No. 799,994. PATENTED SEPT. 19, 1905.
W. H. LITTLE.
FILTER.
APPLICATION FILED NOV. 9, 1904.
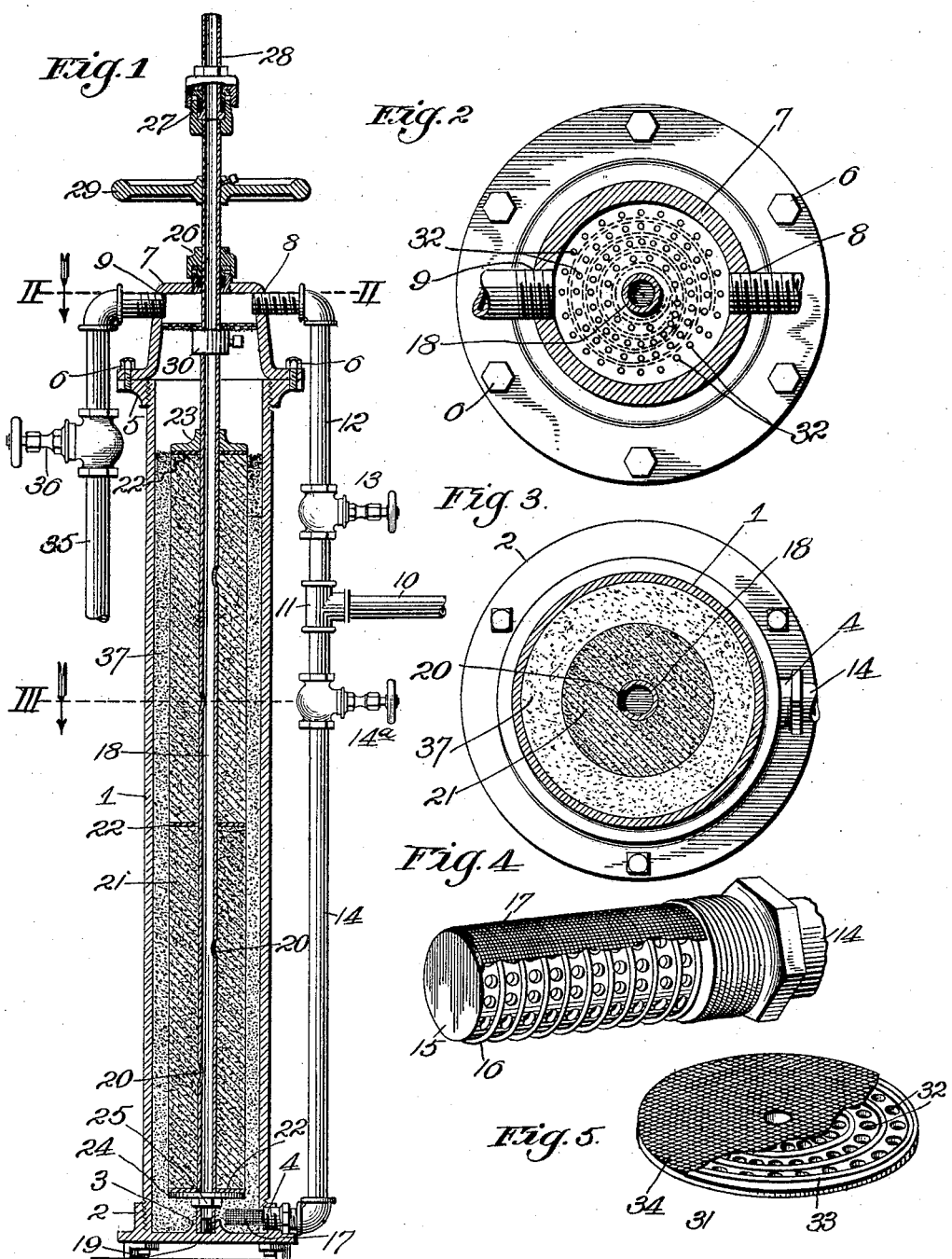
Witnesses
Frank P. Glore.
H. C. Rodgers.
Inventor
W. H. Little
By George J. Thorp
Atty.

UNITED STATES PATENT OFFICE.

WILLIAM H. LITTLE, OF KANSAS CITY, MISSOURI.

FILTER.

No. 799,994.      Specification of Letters Patent.      Patented Sept. 19, 1905.

Application filed November 9, 1904. Serial No. 232,048.

*To all whom it may concern:*

Be it known that I, WILLIAM H. LITTLE, a citizen of the United States, residing at Kansas City, in the county of Jackson and State of Missouri, have invented certain new and useful Improvements in Filters, of which the following is a specification.

This invention relates to pressure-filters, and has for its object to produce a filter which thoroughly filters the water passing through it and which removes most of the impurities of the water before it has access to the final filtration substance.

A further object is to produce a filter of this character by which the impurities removed from the water can be discharged into the sewer in a few moments and without the necessity of dismantling the filter.

A still further object is to provide means in a filter of this character whereby the filtration substance through which the water passes to effect its final purification may be cleaned with great celerity and ease and without dismantling the filter.

With these and other objects in view as hereinafter appear the invention consists in certain novel and peculiar features of construction and organization, as hereinafter described and claimed, and in order that it may be fully understood reference is to be had to the accompanying drawings, in which—

Figure 1 represents a central longitudinal section of the filter. Fig. 2 is an enlarged section on the line II II of Fig. 1. Fig. 3 is a section on a similar scale, taken on the dotted line III of Fig. 1. Fig. 4 is a detail perspective view of a screen-plug, through which the water is passed to remove the accumulation of foreign matter from the filter. Fig. 5 is a detail perspective view of a screen as inverted to prevent the escape of the filtering substance with the impurities.

In the said drawings, 1 designates the casing of the filter, the same being preferably of metal and cylindrical in form and screwed at one end into a head or cap 2, provided centrally at its inner side with a journal-socket 3 and at one side with a threaded opening 4. At its opposite end the casing is screwed into a ring 5, bolted, as at 6, to a cap 7, said cap having threaded openings 8 and 9 and being tapered, preferably, toward its closed end.

10 is a supply-pipe secured by a coupling 11 to pipe 12, screwed into opening 8 at its opposite end and provided with a controlling-valve 13. Pipe 10 is also connected by coupling 11 to pipe 14, having a controlling-valve 14ª and screwed into opening 4, and said pipe 14 is provided with a perforated plug extension 15, having a plurality of external ribs 16 occurring between series of the perforations, the rib being preferably in the form of a coiled wire. Externally embracing and bridging the space between said ribs is a cylindrical screen 17, secured in any suitable manner at its ends to the plug, so that water discharged into the casing of the filter through said plug perforations must first pass through the screen, and in this connection it will be noted that by having the rib 16 helical in form none of the perforations of the plug can be closed to the passage of water, even though the screen itself should be clogged at any particular point or points, as water passing through perforations in line with the point or points clogged will follow the helical pathway provided by the ribs and pass through the screen at an unobstructed point.

18 designates a tube extending axially through the body and journaled at one end in socket 3, and said end of the tube is closed by a plug 19 to prevent water from entering at such point. At suitable intervals said tube is provided with perforations 20, and fitting snugly on the tube is a cylindrical filtering-stone 21 of that character known to the trade as "tripoli." Said stone may be in a single piece or may be composed of two sections, as shown, or more, a gasket 22, of rubber or leather, being disposed between and at the ends of the sections. The filtering-stone extends, by preference, from a point contiguous to cap 2 to a point some distance from cap 5, and at that end the gasket 22 bears against a collar 23, rigid on the tube, the stone being clamped tightly between said collar and the metallic washer 24 by means of a nut 25, screwed upon the contiguous end of the tube.

The tube extends through a stuffing-box 26, secured in cap 7, and carries rigidly at its upper end the stuffing-box 27, said stuffing-box being swiveled on the lower end of the service-pipe 28 for the supply of a boiler and faucets, (not shown,) and mounted rigidly on the tube 18 is a hand-wheel 29 or its equivalent, by which the tube and stone may be turned when desired.

Secured rigidly upon tube 18 between opening 8 and the proximate end of the filtering-stone is a rigid collar 30, and resting upon said collar within cap 7 is a screen consisting of a plate 31, adapted to fit snugly within said cap and provided with perforations 32, arranged, preferably, in a spiral series, and between spiral ribs 33 on the side of said plate toward the filtering-stone and bearing against said ribs and bridging the space between them and secured at its margin to plate is a foraminous plate 34, said plate-like screen 17 being preferably in the form of a finely-perforate gauze of non-corrodible material.

35 designates a pipe screwed into opening 9, leading to the sewer or its equivalent, (not shown,) and 36 is a valve controlling said pipe, the latter being by preference of somewhat greater diameter than the supply-pipes, because it is adapted to remove not only the impure water, but with the same such particles of foreign matter as may be discharged into cap 7 and retained therein by the proximate screen.

37 designates a casing of quartz or coarse sand completely surrounding the filtering-stone, by preference, and in order that such sand may not ordinarily occupy the space between cap 7 and the proximate end of the stone the filter will be ordinarily disposed vertically, as shown in Fig. 1.

Under ordinary conditions all of the valves are closed, and when it is desired to obtain a supply of filtered water valve 13 is opened to permit the water from the supply-pipe 10 to pass into cap 7, thence through the screen thereof and into the casing 1, and as it forces its way down through the sand the latter removes most of the impurities, so that the water after completely surrounding the filtering-stone is comparatively pure and in that condition seeps through said stone to obtain access to the only points of escape—viz., through the perforations of tube 18—being thoroughly purified by the passage through said stone. The water then passes up through said tube and is discharged in a continuous stream as long as valve 13 remains open.

In time the accumulation of foreign matter in and upon the quartz will reduce the capacity of the filter, and in order to restore it to its normal capacity the operator closes valve 13 and opens valve 36 and the valve 14ª, controlling pipe 14, which action causes the water to flow through the last-named pipe and the screened plug into the bottom of the mass of quartz. The pressure of the water lifts the sand bodily until it is arrested by contact with the screen of cap 7, the water at the same time working its way through the quartz. It then passes up through the cap-screen and escapes by way of pipe 35, of course carrying with it the foreign matter which had accummulated in the body. As soon as the water begins to run clear, valves 14ª and 36 are closed, and the filter is again ready to supply purified water. When the quartz is pressed as in the last operation against the cap-screen, it may under some conditions clog part of the surface thereof; but this does not interfere with the proper operation, because the water can pass through the screen at other points and then follow the spiral pathway between the gauze and perforated plate, escaping through the latter and thence through pipe 35.

In order to scrub the surface of the filtering-stone, the wheel 29 may be grasped and turned backward and forward while the water is passing up through the quartz, the friction between the stone and quartz serving to clean the former, and, furthermore, if the outer surface of the stone is not originally concentric with its axis, will in a very short time grind off the eccentric portion, so that the stone may be revolved easily.

From the above description it will be apparent that I have produced a pressure-filter which possesses the features of advantage enumerated as desirable in the statement of the object of the invention and which is obviously susceptible of modification without departing from the principle of construction involved.

Having thus described the invention, what I claim as new, and desire to secure by Letters Patent, is—

1. A filter, comprising a casing, a cap closing one end of the casing and provided with an opening, a cap closing the other end of the casing and provided with a pair of openings, valve-controlled pipes communicating with the openings of the last-named cap, a partitioning-screen between said pipes and the opening in the first-named cap, said screen consisting of a plate provided with a spiral series of perforations and with a spiral rib between said perforations, and a foraminous plate bridging the spiral pathway between said ribs and secured against the latter, a valve-controlled pipe communicating with the opening in the first-named cap and connected to one of the other pipes, a perforated tube extending longitudinally of the casing and through the cap provided with the pair of pipes, a collar on said tube to hold the screen reliably in place, and a filtering-stone secured upon said tube and covering its perforated part.

2. A filter, comprising a casing, a cap closing one end of the casing and provided with an opening and with a journal-socket, a cap closing the other end of the casing and provided with a pair of openings, valve-controlled pipes communicating with the openings in the last-named cap, a partitioning-screen between said pipes and the opening in the first-named cap, said screen consisting of a plate provided with a spiral series of perforations and with a spiral rib between said perforations, and a foraminous plate bridging the spiral pathway between said ribs and secured against the latter, a valve-controlled pipe communicating with the opening in the first-named cap and connected to one of the other pipes, a perforated tube extending longitudinally of the casing and through the cap provided with a pair of pipes and having one end plugged tightly and journaled in said journal-socket, a collar on said tube to hold the screen reliably in place, a filtering-stone secured upon said tube and covering its perforated part, a mass of quartz, and a hand-wheel secured rigidly on said tube to turn the same.

3. In a filter, the combination of a casing, a perforated tube journaled in and extending longitudinally of the casing, a filtration-stone secured rigidly on the perforated part of the tube, a mass of quartz in the casing around said stone, a valve-controlled pipe projecting into the casing and having an extension formed with a helical series of perforations and with a helical rib between said perforations and provided with a wire-gauze covering for said ribs and perforations to prevent the latter being clogged by said quartz, a pair of valve-controlled pipes communicating with the opposite end of the casing, and a partitioning-screen between the ends of said pipes and the quartz to prevent the latter passing out of the casing and into either of said pipes.

In testimony whereof I affix my signature in the presence of two witnesses.

WILLIAM H. LITTLE.

Witnesses:
 H. C. RODGERS,
 G. Y. THORPE.